Jan. 17, 1961 W. L. WILSON 2,968,529
PRODUCTION OF METAL OXIDE PIGMENTS
Filed Nov. 15, 1957

INVENTOR.
WILLIAM L. WILSON
BY
ATTORNEY

2,968,529
PRODUCTION OF METAL OXIDE PIGMENTS

William L. Wilson, Barberton, Ohio, assignor to Columbia-Southern Chemical Corporation, Allegheny County, Pa., a corporation of Delaware Filed Nov. 15, 1957, Ser. No. 696,743

5 Claims. (Cl. 23—202)

The present invention relates to the preparation of titanium dioxide. More particularly, the instant discovery pertains to the vapor-phase oxidation of titanium tetrachloride in the presence of an additive to produce an improved titanium dioxide pigment.

In attempting to produce pigment-grade titanium dioxide by reacting titanium tetrachloride with an oxygen-containing gas, such as $O_2$ and air, in a vapor phase, the art has been plagued by the fact that coarse, non-uniform $TiO_2$ particulates having poor tinting strength, hiding power, etc., generally result. Furthermore, the art has not been able to control to any desirable degree the crystalline form of the pigment produced.

According to the present invention, however, it has been found that a well-dispersed titanium dioxide pigment of small, uniform particle size and having improved tinting strength can be produced by a vapor phase oxidation process in which titanium tetrachloride and an oxygen-containing gas are reacted under controlled conditions and in the presence of relatively small, regulated amounts of an aromatic organic compound.

In other words, the process of the present invention comprises reacting titanium tetrachloride in a vapor state with an oxygen-containing gas, such as air or oxygen, at a temperature between 700° C. and 1500° C. and in the presence of an aromatic organic compound in the concentration of 0.01 to 20 mole percent, basis the titanium tetrachloride, and recovering resulting titanium dioxide pigment substantially as formed.

Among the many aromatic organic compounds suitable for the present invention are benzene and its derivatives, such as halobenzenes, phenols, alkylbenzenes, alkoxybenzenes, arylbenzenes, and the like. Typical of these are mono-, di- and tri-chlorobenzene, phenol, pentachlorophenol, toluene, xylene, anisole, diphenyl, and the like. Naphthalene and its derivatives, such as halonaphthalenes, naphthols, alkylnaphthalenes, arylnaphthalenes, and the like, are also suitable. Among these, for example, are α-chloronaphthalene, β naphthol, α-methylnaphthalene, methyl naphthyl ether, and phenyl naphthalene. Other typical aromatic-type compounds included in the expression "aromatic organic compounds" used herein are tetrahydronaphthalene, thiophene, furan, and the like. Among other aromatics contemplated herein are anthracene and its derivatives and, in general, aromatic compounds which are vaporized at a temperature between 700° C. and 1500° C. and which do not react with titanium to precipitate a complex which could in any way be detrimental to the titanium dioxide pigment produced.

In a preferred embodiment, a mixture of $TiCl_4$ and an aromatic organic compound of the type contemplated herein is preheated to a temperature between 500° C. and 1000° C., preferably between 700° C. and 900° C., before being mixed in the reaction zone with an oxygen-containing gas which is separately preheated to approximately the same temperature before being introduced into the reaction zone.

$TiO_2$ pigment is precipitated from the reaction and recovered substantially as formed. Gaseous effluent from the reaction comprises predominantly chlorine gas with a fractional amount of HCl, the amount of HCl being dependent upon the percentage of aromatic organic compound added.

The mole ratio of $TiCl_4$ to $O_2$ may range from 1:1 to 1:10. As to the aromatic organic compound, while a range from 0.01 to 20 mole percent, basis the titanium tetrachloride, is suitable, a preferred range is from 0.1 to 5 mole percent.

The reason for the enhanced results of the present discovery are not fully understood, but it is felt that the aromatic organic compounds such as the benzene derivatives, decomposed in the reaction zone to afford nucleating particles which are responsible for particle size control.

The invention will be more clearly understood from the drawings which are merely illustrative and are not intended to limit the scope of the discovery.

Figure 1:
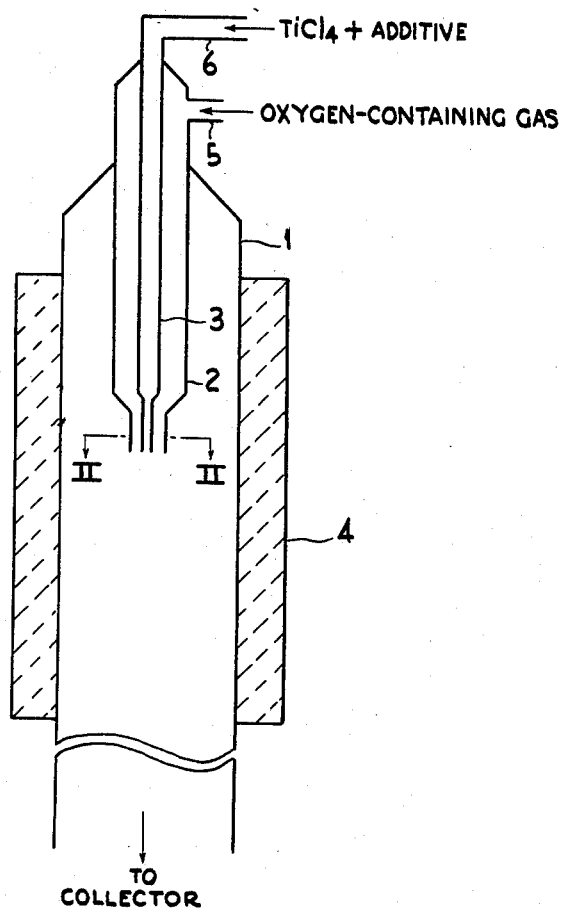
Figure 1 is a diagrammatic vertical section of an orifice-annulus burner and furnace.

Referring to Figure 1, three vertically-disposed tubes 1, 2 and 3 pass into furnace 4, tube 3 being disposed within tube 2 and concentrically-located with respect thereto, and tube 2 being, in turn, disposed within tube 1 and being concentrically-located with respect thereto. Tubes 2 and 3, respectively, are spaced apart from the internal walls of the tubes they inhabit, thus providing annular spaces therebetween. Both tubes 2 and 3 are open at their lower ends and, in addition, have conduits 5 and 6, respectively, leading into their upper ends.

Only the upper portion of tube 1 is disposed within furnace 4, the lower portion leading to a collector indicated but not shown in the drawings. The lower open ends of tubes 2 and 3 terminate at points within tube 1 laterally delineated by furnace 4.

Figure 2:
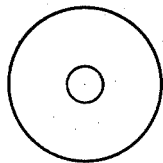
Figure 2 is a diagrammatic cross-section of the orifice-annulus section of the burner in Figure 1, taken substantially along the line II—II of Figure 1.

Figure 2, while diagrammatic, shows tubes 2 and 3 in cross-section, thus further illustrating the orifice-annulus type of burner of Figure 1.

The instant discovery will best be understood by reference to the following examples, which, although detailed, are not intended to restrict the scope of the invention:

EXAMPLE I

A two-inch, vertically-disposed porcelain (mullite) tube 1 was provided which was heated for twenty-four inches of its length by electric furnace 4, the upper and lower halves of vertically-mounted furnace 4 being separately controlled. An orifice-annulus burner (tubes 2 and 3), vertically-disposed and directed into tube 1 extended 6 inches below the furnace 4 top, thus utilizing the upper 6-inch portion of furnace 4 as a preheater and the lower 18 inches as a reaction zone heater.

The burner, fabricated from silica tubing (quartz and Vycor), had an orifice having an inside diameter of 1.25 millimeters. The annulus of the burner had an inside diameter of 3.1 millimeters and an outside diameter of 5.2 millimeters.

A vapor mixture of $TiCl_4$ and benzene was fed into tube 3 while simultaneously feeding oxygen into tube 2 at the rates, temperatures and concentrations given in the following table:

Table I

| TiCl₄ Feed Rate [1] | O₂ Molar Ratio [2] | Benzene Concentration [3] | Preheat Temp., °C | Reaction Temp., °C |
|---|---|---|---|---|
| 7.1 | 2.0 | 2.0 | 825 | 1,000 |
| 7.1 | 2.5 | 2.0 | 825 | 1,000 |
| 6.9 | 2.0 | 2.0 | 825 | 1,000 |
| 6.7 | 2.0 | 2.0 | 850 | 1,000 |
| 4.8 | 2.1 | 2.0 | 825 | 1,000 |
| 8.9 | 2.0 | 4.0 | 825 | 1,000 |
| 6.9 | 2.0 | 2.0 | 825 | 950 |

[1] Millimoles per minute.
[2] O₂/TiCl₄ molar ratio.
[3] Mole percent, TiCl₄ basis.

The TiO₂ pigments resulting from the runs in Table I were well-dispersed and of uniform particle size, had good tinting strengths and were predominantly in the rutile crystalline form.

EXAMPLE II

As in Example I, above, a tube 1 was inserted in a furnace 4, the tube and furnace having the same dimensions and relative positions. An orifice-annulus burner (tubes 2 and 3) was also provided as in Example I, only the burner dimensions were slightly different as to orifice and annulus sizes. The orifices had an inside diameter of one millimeter and the annulus an inside diameter of 2.5 millimeters and an outside diameter of 5.0 millimeters.

A mixture of TiCl₄ and an aromatic organic compound was fed through tube 3 and a mixture of O₂ and Cl₂ was fed through tube 2 at the rates, temperatures and concentrations given in the following table:

Table II

| TiCl₄ Feed Rate [1] | O₂ Feed Rate [2] | Cl₂ Feed Rate [3] | Additive | Concentration of Additives [4] | Preheat Temp., °C | Reaction Temp., °C |
|---|---|---|---|---|---|---|
| 5.23 | 19.9 | 0.25 | Monochlorobenzene | 4.0 | 825 | 1,000 |
| 4.71 | 19.9 | 0.25 | Trichlorobenzene | 6.7 | 825 | 1,000 |
| 4.84 | 19.9 | 0.25 | Diphenyl | 1.65 | 825 | 1,000 |
| 5.03 | 19.9 | 0.25 | Naphthalene | 2.0 | 825 | 1,000 |

[1, 2, 3] Millimoles per minute.
[4] Mole percent, TiCl₄ basis.

While the above example includes the use of Cl₂ in the oxygen feed, it is not absolutely necessary, since the Cl₂ may be eliminated with substantially identical results.

Even though the experiments described herein were made at substantially atmospheric pressure, pressures ranging from 0.5 to 3.0 atmospheres are suitable.

Although the present invention has been described in detail as to particular embodiments thereof, it is not intended that these details shall limit the scope of the invention except insofar as included in the accompanying claims.

What is claimed:

1. In a method of preparing titanium dioxide by reacting titanium tetrachloride in vapor state with an oxygen-containing gas, the improvement which comprises conducting the reaction while introducing into contact with the reacting titanium tetrachloride controlled added amounts of an aromatic organic compound, and recovering the resulting titanium dioxide pigment, the quantity of the aromatic organic compound contacting the reacting titanium tetrachloride being at least about 0.01 mole percent, based upon the titanium tetrachloride undergoing reaction.

2. Method which comprises pre-mixing titanium tetrachloride and an aromatic organic compound in the concentration of 0.01 to 20 mole percent, based upon the titanium tetrachloride, and reacting the resulting mixture with an oxygen-containing gas at a temperature between 700° C. and 1500° C. and recovering the resulting titanium dioxide pigment substantially as formed.

3. Method which comprises pre-heating a mixture of titanium tetrachloride and an aromatic organic compound in the concentration of 0.01 to 20 mole percent, based upon the titanium tetrachloride, and reacting a pre-heated oxygen-containing gas with said mixture at a temperature between 700° C. and 1500° C. and recovering the resulting titanium dioxide pigment substantially as formed.

4. The method of claim 3 in which the reactants are pre-heated to a temperature between 500° C. and 1000° C.

5. In a method of preparing titanium dioxide by reacting titanium tetrahalide in vapor state with an oxygen-containing gas, the improvement which comprises conducting the reaction while introducing benzene into contact with the reacting titanium tetrahalide, and recovering the resulting titanium dioxide pigment.

References Cited in the file of this patent

UNITED STATES PATENTS 2,789,886   Kraus _____ Apr. 23, 1957

FOREIGN PATENTS 148,000   Australia _____ Sept. 2, 1952

OTHER REFERENCES

Porter: "Petroleum Dictionary," 3rd Ed., 1930, Gulf Publ. Co., p. 22.

Gruse et al.: "The Chemical Technology of Petroleum," 2nd Ed., 1942, McGraw-Hill, pp. 6 and 7.

Sachanen: "The Chemical Constituents of Petroleum," Reinhold Publ. Co., 1945, p. 425.